United States Patent
Iyoda (10) Patent No.: US 8,527,149 B2
(45) Date of Patent: Sep. 3, 2013

(54) PASSENGER PROTECTION DEVICE

(75) Inventor: Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 853 days.

(21) Appl. No.: 12/282,885

(22) PCT Filed: Feb. 7, 2007

(86) PCT No.: PCT/JP2007/052654
§ 371 (c)(1),
(2), (4) Date: Sep. 15, 2008

(87) PCT Pub. No.: WO2007/119285
PCT Pub. Date: Oct. 25, 2007

(65) Prior Publication Data
US 2009/0138160 A1 May 28, 2009

(30) Foreign Application Priority Data
Mar. 22, 2006 (JP) ................................. 2006-079114

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............ 701/45; 701/36; 701/46; 701/47; 701/301; 340/436; 340/903; 180/274; 280/734

(58) Field of Classification Search
USPC ............... 701/45, 301, 1, 36, 46, 47, 48, 49, 701/70, 82, 93; 180/271, 274, 275, 282; 280/734; 340/435, 436, 438, 440, 459, 903
See application file for complete search history.

(56) References Cited

U.S. PATENT DOCUMENTS
5,936,549 A 8/1999 Tsuchiya
7,243,944 B2 7/2007 Imai et al.
(Continued)

FOREIGN PATENT DOCUMENTS
CN 1 578 741 A 2/2005
DE 197 24 496 12/1997
(Continued)

OTHER PUBLICATIONS
English translation of JP2005280380.*
(Continued)

*Primary Examiner* — Rami Khatib
(74) *Attorney, Agent, or Firm* — Oblon, Spivak, McClelland, Maier & Neustadt, L.L.P.

(57) ABSTRACT

In a passenger protection device, an object detection unit detects a relative position of an object in a circumference of a vehicle to the vehicle. A side collision prediction unit predicts that the object is about to collide with a side face of the vehicle, based on the relative position detected by the object detection unit. An impact detection unit detects an impact of the object on the vehicle side face. A side collision judgment unit determines whether the object has collided with the vehicle side face, based on the impact detected by the impact detection unit. A passenger protection unit protects a passenger in the vehicle. When the side collision prediction unit predicts that the object is about to collide with the vehicle side face and the side collision judgment unit determines that the object has collided with the vehicle side face, the passenger protection unit is initiated.

11 Claims, 7 Drawing Sheets

(56) References Cited

U.S. PATENT DOCUMENTS

| | | | |
|---|---|---|---|
| 7,444,218 | B2 | 10/2008 | Ueno |
| 2002/0099486 | A1 | 7/2002 | Nagao et al. |
| 2003/0100983 | A1 | 5/2003 | Bullinger et al. |
| 2003/0182041 | A1 | 9/2003 | Watson |
| 2004/0036261 | A1 | 2/2004 | Breed |
| 2006/0196712 | A1 * | 9/2006 | Toyota et al. ............... 180/165 |
| 2006/0244245 | A1 | 11/2006 | Nonaka et al. |
| 2007/0124049 | A1 * | 5/2007 | Lich et al. .................. 701/45 |
| 2007/0271016 | A1 * | 11/2007 | Loeckle et al. ............. 701/45 |
| 2008/0208413 | A1 * | 8/2008 | Willig et al. ............... 701/45 |

FOREIGN PATENT DOCUMENTS

| | | | |
|---|---|---|---|
| DE | 199 46 407 | | 4/2001 |
| DE | 100 49 911 | | 4/2002 |
| DE | 103 12 105 | A1 | 9/2004 |
| DE | 10312105 | A1 * | 9/2004 |
| DE | 103 17 640 | A1 | 11/2004 |
| DE | 10 2004 007 800 | A1 | 9/2005 |
| DE | 10 2004 029 817 | A1 | 1/2006 |
| DE | 10 2006 018 901 | A1 | 12/2006 |
| DE | 10 2006 002 747 | A1 | 7/2007 |
| EP | 1 225 100 | | 7/2002 |
| EP | 1 566 312 | A2 | 8/2005 |
| JP | 7 47915 | | 2/1995 |
| JP | 7-132793 | | 5/1995 |
| JP | 7-223505 | | 8/1995 |
| JP | 11 180249 | | 7/1999 |
| JP | 2001 206176 | | 7/2001 |
| JP | 2003 182508 | | 7/2003 |
| JP | 2005-145179 | | 6/2005 |
| JP | 2005-247271 | A | 9/2005 |
| JP | 2005-263145 | A | 9/2005 |
| JP | 2005 280380 | | 10/2005 |
| JP | 2005280380 | A * | 10/2005 |
| JP | 2006-7985 | A | 1/2006 |
| WO | WO 99/47389 | A1 | 9/1999 |
| WO | WO 2004/094195 | A1 | 11/2004 |
| WO | 2005 016703 | | 2/2005 |
| WO | WO 2005/123462 | A1 | 12/2005 |

OTHER PUBLICATIONS

Office Action issued Jan. 31, 2011, in German Patent Application No. 11 2007 000 606.4-21.

Office Action issued Jun. 19, 2012, in Japanese Patent Application No. 2009-275158 with English translation.

* cited by examiner

PASSENGER PROTECTION DEVICE

TECHNICAL FIELD

This invention relates to a passenger protection device which protects a passenger in an automotive vehicle at the time of vehicle side collision.

BACKGROUND ART

Conventionally, there is known a collision determination device which is provided with wall side acceleration sensors disposed in right and left side walls of a vehicle and with a central acceleration sensor (safing sensor) disposed at a central part of the vehicle. For example, refer to Japanese Laid-Open Patent Application No. 11-180249.

In this collision determination device, the integral of an acceleration detected by each of the wall side acceleration sensors and the central acceleration sensor is calculated, and when the integral value exceeds a predetermined threshold, a comparator outputs the comparison result in order to initiate a passenger protection unit in the vehicle.

However, in the above-mentioned collision determination device, if the predetermined threshold is changed to a larger value in order to prevent the malfunction of the passenger protection unit, there is a problem that the passenger protection unit is not initiated at the time the passenger protection unit should be initiated because of the larger threshold value.

On the other hand, if the predetermined threshold is changed to a smaller value in order to obviate the above-mentioned inoperability of the passenger protection unit, there is a possibility that the malfunction of the passenger protection device is caused because of the smaller threshold value.

Moreover, the position where the central acceleration sensor is disposed in the vehicle is farther from the position where the impact of side collision is exerted on the vehicle than the positions in which the side wall acceleration sensors are disposed. Therefore, there is a possibility that the judgment of the acceleration detected by the central acceleration sensor based on the threshold is delayed from the judgment of the acceleration detected by the side wall acceleration sensors based on the threshold.

Furthermore, the acceleration detected by the central acceleration sensor may have the amount of attenuation that is larger than that of the acceleration detected by the side wall acceleration sensors. For this reason, there is a problem that the accuracy of judgment of the acceleration detected by the central acceleration sensor based on the threshold is degraded, which may cause the malfunction of the passenger protection device.

DISCLOSURE OF THE INVENTION

According to one aspect of the invention, there is provided an improved passenger protection device in which the above-mentioned problems are eliminated.

According to one aspect of the invention, there is provided a passenger protection device which is adapted for initiating a passenger protection unit certainly and preventing the malfunction of the passenger protection device.

In an embodiment of the invention which solves or reduces one or more of the above-mentioned problems, there is provided a passenger protection device which comprises: an object detection unit detecting a relative position of an object in a circumference of a vehicle, to the vehicle; a side collision prediction unit predicting that the object is about to collide with a side face of the vehicle, based on the relative position detected by the object detection unit; an impact detection unit detecting an impact of the object on the vehicle side face; a side collision judgment unit determining whether the object has collided with the vehicle side face, based on the impact detected by the impact detection unit; and a passenger protection unit protecting a passenger in the vehicle, wherein, when the side collision prediction unit predicts that the object is about to collide with the vehicle side face and the side collision judgment unit determines that the object has collided with the vehicle side face, the passenger protection unit is initiated.

According to this embodiment, when the side collision prediction unit predicts that the object is about to collide with the vehicle side face and the side collision judgment unit determines that the object has collided with the vehicle side face, the passenger protection unit is initiated. Thereby, the malfunction of the passenger protection device can be prevented and the passenger protection unit can be initiated certainly.

The above-mentioned passenger protection device may be configured so that the impact detection unit includes at least one of a pressure sensor and an acceleration sensor which detect an impact of the object on the vehicle side face. The pressure sensor and the acceleration sensor are provided to detect an impact on the vehicle side face when the object collides with the vehicle side face.

The above-mentioned passenger protection device may be configured so that the object detection unit includes at least one of an ultrasonic sensor which transmits an ultrasonic wave to the object, a radar sensor which transmits an electric wave to the object, and an imaging sensor which acquires an image of the object. The ultrasonic sensor, the radar sensor and the imaging sensor are provided to detect a relative position of the object to the vehicle.

The above-mentioned passenger protection device may be configured so that the passenger protection unit is an air bag device disposed in the side face of the vehicle.

In an embodiment of the invention which solves or reduces one or more of the above-mentioned problems, there is provided a passenger protection device which comprises: a first impact detection unit disposed in a vehicle side face of a vehicle to detect an impact of an object on the vehicle side face; a first side collision judgment unit determining whether the object has collided with the vehicle side face, based on the impact detected by the first impact detection unit; a second impact detection unit disposed in a position different from a position of the first impact detection unit to detect an impact of the object on the vehicle side face; a second side collision judgment unit determining whether the object has collided with the vehicle side face, based on the impact detected by the second impact detection unit; a behavior judgment unit determining whether a behavior of the vehicle is in an unstable state; and a passenger protection unit protecting a passenger in the vehicle, wherein, when the first side collision judgment unit determines that the object has collided with the vehicle side face and either the second side collision judgment unit determines that the object has collided with the vehicle side face, or the behavior judgment unit determines that the behavior of the vehicle is in an unstable state, the passenger protection unit is initiated.

According to this embodiment, when at least one of a judgment of the second side collision judgment that the object has collided with the vehicle side face and a judgment of the behavior judgment unit that the behavior of the vehicle is in an unstable state is performed and a judgment of the first side collision judgment unit that the object has collided with the vehicle side face, the passenger protection unit is initiated. Thereby, the malfunction of the passenger protection device can be prevented and the passenger protection unit can be initiated certainly.

The above-mentioned passenger protection device may be configured so that the second side collision judgment unit determines that the object has collided with the vehicle side face, when a value of the impact detected by the second impact detection unit exceeds a predetermined threshold, and the second side collision judgment unit reduces the predetermined threshold when the behavior judgment unit determines that the behavior of the vehicle is in an unstable state.

The above-mentioned passenger protection device may be configured so that each of the first impact detection unit and the second impact detection unit includes at least one of a pressure sensor and an acceleration sensor which detect an impact of the object on the vehicle side face.

The above-mentioned passenger protection device may be configured so that the first impact detection unit is disposed in the side face of the vehicle.

The above-mentioned passenger protection device may be configured so that the second impact detection unit is disposed at a central part of the vehicle.

The above-mentioned passenger protection device may be configured so that the behavior judgment unit determines whether the behavior of the vehicle is in an unstable state, based on an output signal received from a vehicle control device which performs a control process to stabilize an operation of the vehicle.

According to the embodiments of the passenger protection device of the invention, the malfunction of the passenger protection device can be prevented and the passenger protection unit can be initiated certainly.

BRIEF DESCRIPTION OF THE DRAWINGS

Other objects, features and advantages of the present invention will be apparent from the following detailed description when reading in conjunction with the accompanying drawings.

BEST MODE FOR CARRYING OUT THE INVENTION

A description will now be given of an embodiment of the invention with reference to the accompanying drawings.

Figure 1:
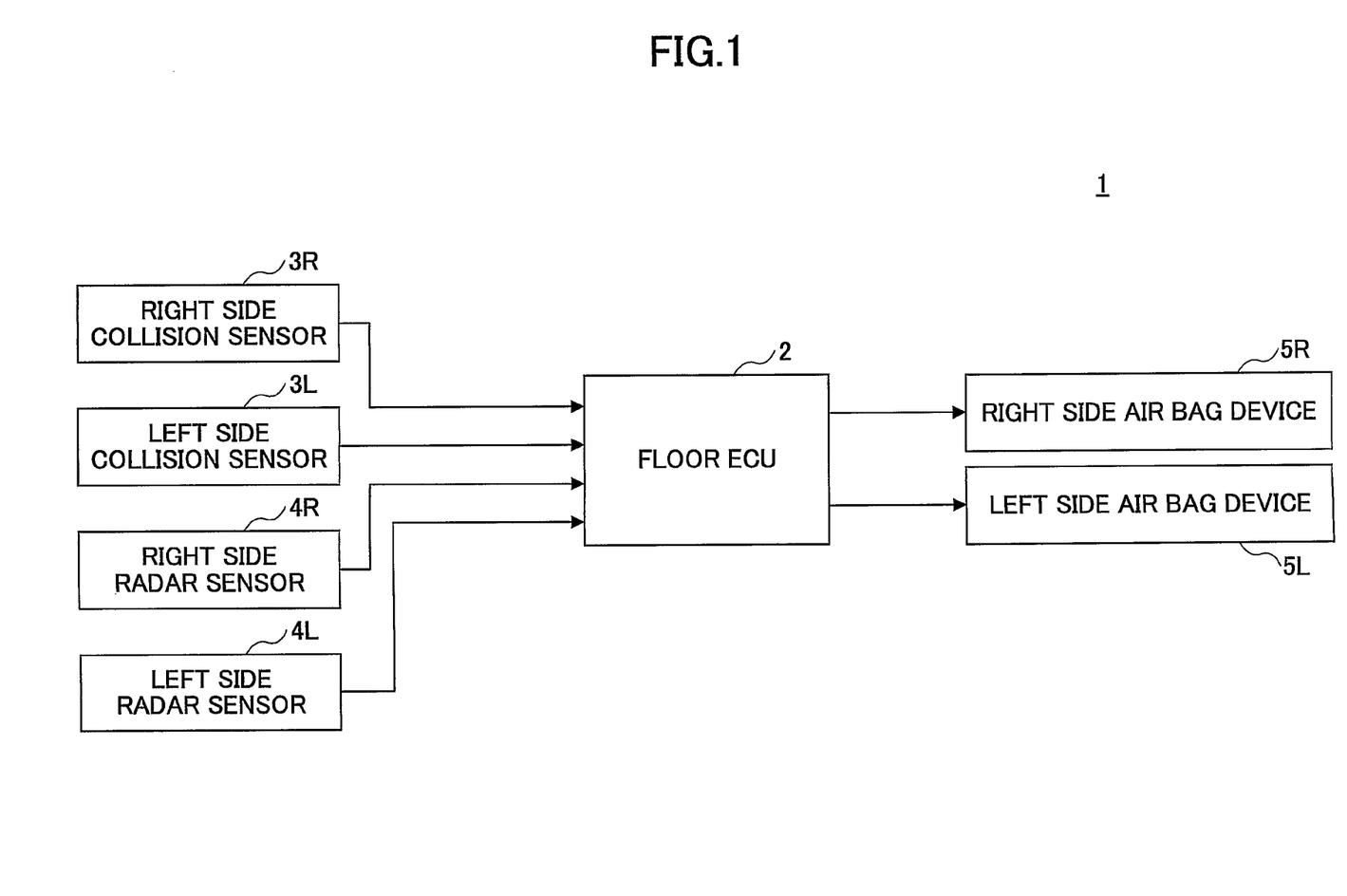
FIG. 1 is a block diagram showing the composition of a passenger protection device in an embodiment of the invention.

FIG. 1 shows the composition of a passenger protection device in an embodiment of the invention. The passenger protection device 1 in this embodiment is mainly constituted by a floor ECU (electronic control unit) 2 which is disposed in a front side of a vehicle. The floor ECU 2 performs control processing of the passenger protection device 1.

The floor ECU 2 is made of a microcomputer and performs various control processes according to a control and operation program. The floor ECU 2 includes a CPU which controls respective elements of the passenger protection device, a ROM which stores the program for execution by the CPU, a rewritable RAM (random access memory) which stores operation results, etc., a timer, a counter, an input/output interface, etc.

Figure 2:
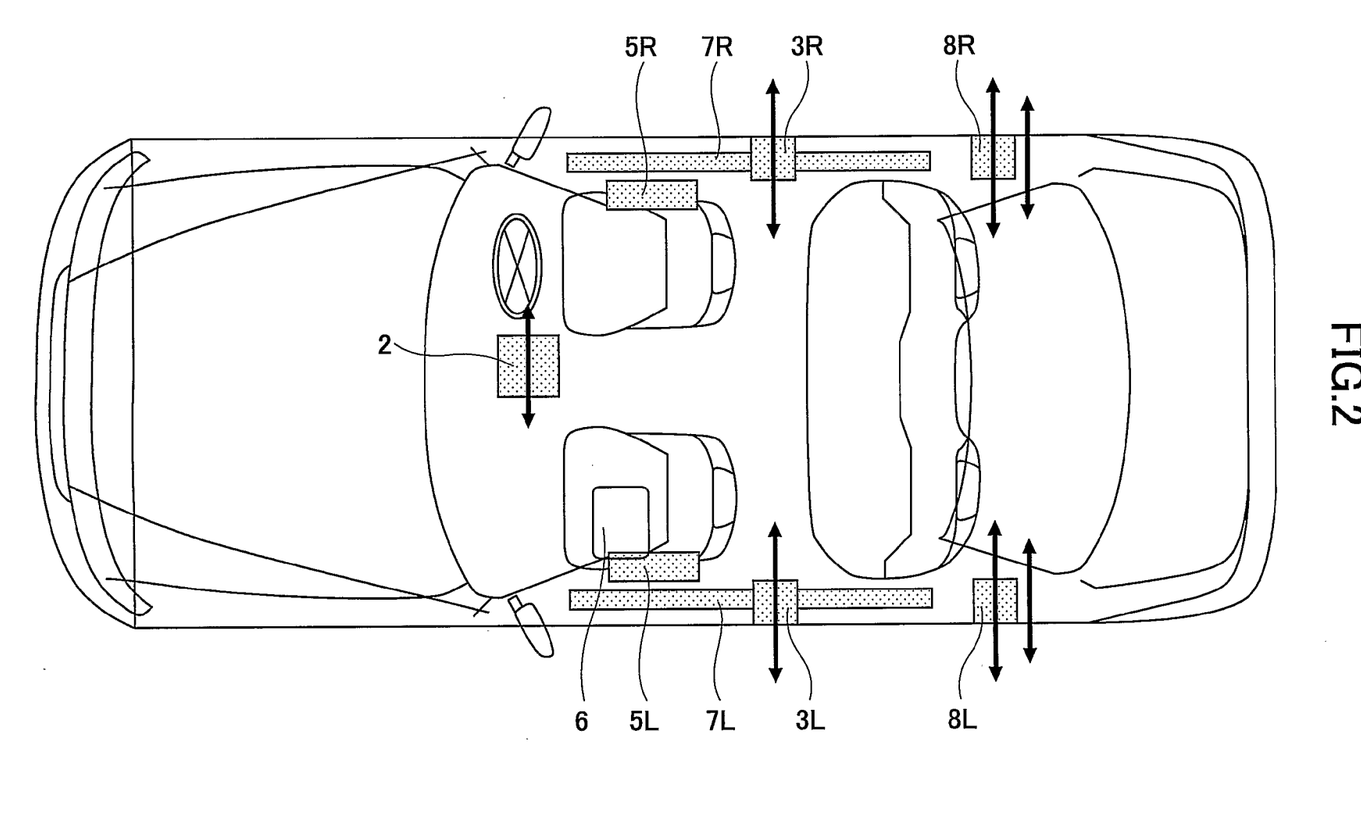
FIG. 2 is a top view of a vehicle showing the positions where a floor ECU, right and left side collision sensors, right and left side air bag devices, and right and left side curtain shield air bag devices are disposed in the vehicle.

A right side collision sensor 3R which is disposed in the vicinity of the center pillar (B pillar) in the center of a right side wall of the vehicle, and a left side collision sensor 3L which is disposed in the vicinity of the center pillar in the center of a left side wall of the vehicle are connected to the floor ECU 2 (see FIG. 2).

The right side collision sensor (impact detection unit) 3R is, for example, an acceleration sensor which mainly detects an acceleration in the vehicle right/left direction with respect to the vehicle right side face. The left side collision sensor (impact detection unit) 3L is, for example, an acceleration sensor which mainly detects acceleration in the vehicle right/left direction with respect to the vehicle left side face.

The right side collision sensor 3R and the left side collision sensor 3L transmit the detected acceleration to the floor ECU 2. In addition, a semiconductor type G sensor may be used as the above-mentioned acceleration sensor.

Moreover, right and left side radar sensors 4R and 4L (object detection unit) for side collision PCS (pre-crash) detection are connected to the floor ECU 2. For example, the radar sensors 4R and 4L are disposed in the left side and the right side of the vehicle, respectively. The radar sensors 4R and 4L are provided to detect a relative position of an object, existing in the circumference of the vehicle, to the vehicle.

Each of the radar sensors 4R and 4L transmits an electric wave, such as a millimeter wave and microwave, to an object in the circumference of the vehicle, such as another vehicle or an obstacle, generally in a direction perpendicular to the direction of travel of the vehicle.

Specifically, the right side radar sensor 4R detects a relative position of a right side object to the vehicle (distance between the vehicle and the object), a relative moving direction of the right side object to the vehicle, and a moving speed (approaching speed) of the right side object to the vehicle, based on the reflected wave from the right side-object.

On the other hand, the left radar sensor 4L detects a relative position of a left side object to the vehicle (distance between the vehicle and the object), a relative moving direction of the left side object to the vehicle, and a moving speed (approaching speed) of the left side object to the vehicle, based on the reflected wave from the left side object.

In addition, each of the radar sensors 4R and 4L computes the distance between the object and the vehicle and the relative moving direction of the object based on the relative position of the object, and computes the moving speed of the object to the vehicle by computing a differentiation of the distance.

Each of the radar sensors 4R and 4L transmits the detected position of the object, and the relative moving direction and the moving speed of the object to the vehicle, to the floor ECU 2.

A right side air bag device 5R disposed for the driver seat in the vehicle side face on the driver's side, and a left side air bag device 5L disposed for the front passenger seat in the vehicle side face on the front passenger's side are connected to the floor ECU 2.

In each of the right and left side air bag devices 5R and 5L, the inflator provided therein is driven in accordance with a control signal received from the floor ECU 2, so that the side air bag is deployed by the inflator. Thereby, the side of each of the passengers who sit down on the driver's seat and the passenger seat can be protected by the side air bag devices 5R and 5L.

Figure 3:
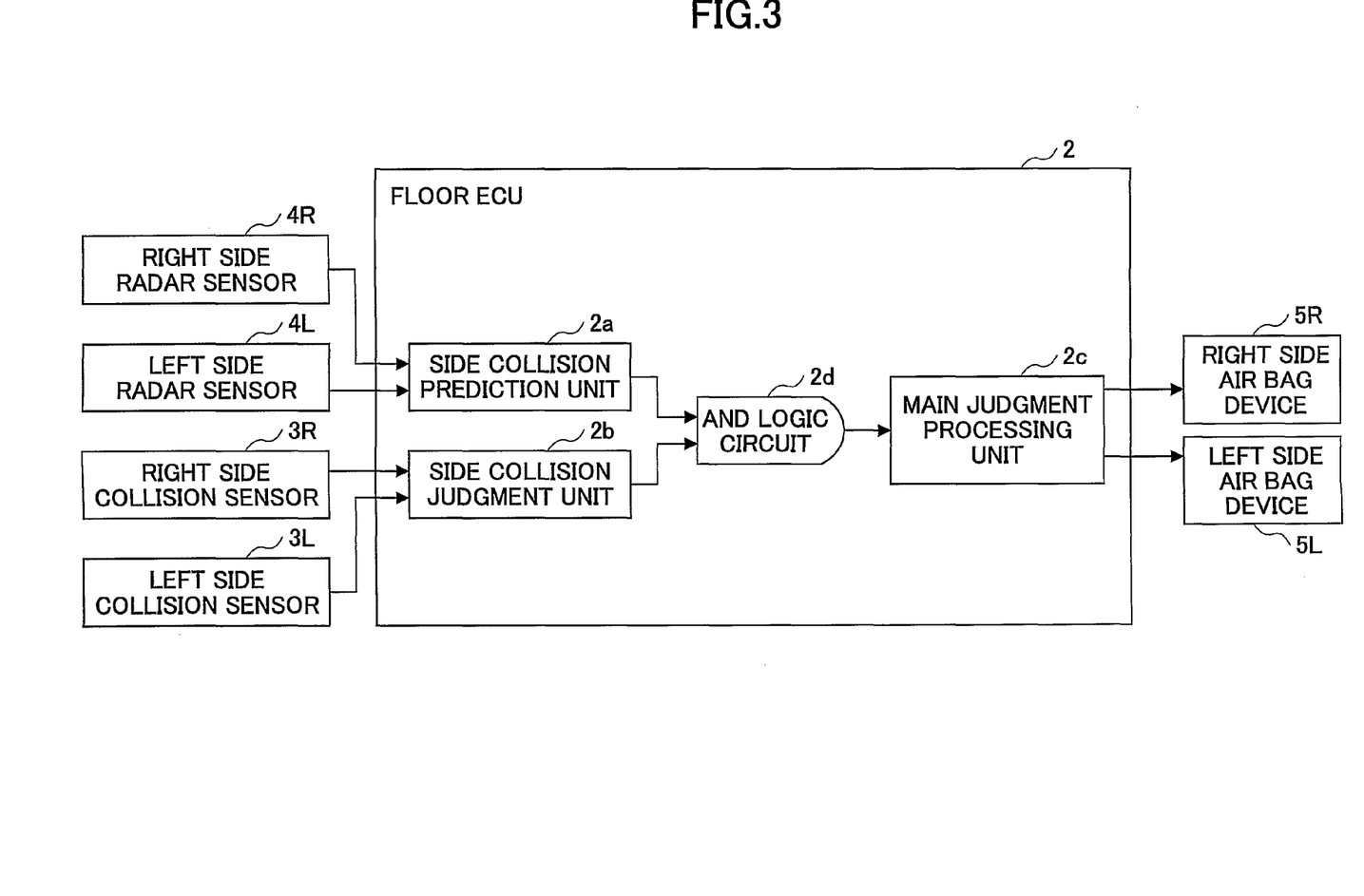
FIG. 3 is a block diagram of the floor ECU of the passenger protection device in this embodiment.

As shown in FIG. 3, the floor ECU 2 is constituted so that the floor ECU 2 includes a side collision prediction unit 2a which predicts that an object is about to collide with the vehicle side face, a side collision judgment unit 2b which determines whether the object has collided with the vehicle side face, and a main judgment processing unit 2c which transmits a control signal to the side air bag devices 5R and 5L based on the prediction of the collision by the side collision prediction unit 2a and the judgment of the collision by the side collision judgment unit 2b.

The side collision prediction unit 2a is provided to predict that the object concerned is about to collide with the vehicle side face. In other words, the side collision prediction unit 2a judges that the collision of the object with the vehicle side face is in an inescapable state, or the object is in a dangerous condition with a high possibility of collision with the vehicle side face.

Specifically, the side collision prediction unit 2a predicts that a right side object is about to collide with the vehicle right side, based on the distance between the right side object and the vehicle right side, and the relative moving direction and the moving speed of the object to the vehicle right side, which are detected by the right side radar sensor 4R.

Moreover, the side collision prediction unit 2a predicts that a left side object is about to collide with the vehicle left side, based on the distance between the vehicle left side and the left side object, and the relative moving direction and the moving speed of the object to the vehicle left side, which are detected by the left side radar sensor 4L.

Specifically, the side collision judgment unit 2b determines that the object has collided with the vehicle right side, when the acceleration in the vehicle right/left direction detected by the right side collision sensor 3R exceeds a predetermined threshold N1. Moreover, the side collision judgment unit 2b determines that the object has collided with the vehicle left side, when the acceleration in the vehicle right/left direction detected by the left side collision sensor 3L exceeds the predetermined threshold N1.

The main judgment processing unit 2c determines that the side collision prediction unit 2a predicts that the object is about to collide with the vehicle, and that the side collision judgment unit 2b judges that the object has collided with the vehicle, based on the output value "1" from the AND logic circuit 2d. Then the main judgment processing unit 2c transmits a control signal to the side air bag devices 5R and 5L.

In addition, the main judgment processing unit 2c may judge whether the passenger sits down on the seat, based on an output signal received from a seat sensor 6, such as a load sensor. When it is judged that the passenger sits down on the seat and that the above-mentioned collision judgment is carried out (the output value received from the AND logic circuit 2d is set to "1"), the main judgment processing unit 2c may transmit a control signal to the side air bag devices 5R and 5L.

In the embodiment of FIG. 3, the side collision prediction unit 2a outputs "1" to the AND logic circuit 2d, when it predicts that the object is about to collide with the vehicle.

Moreover, the side collision judgment unit 2b outputs "1" to the AND logic circuit 2d, when it judges that the object has collided with the vehicle.

In the embodiment of FIG. 3, the AND logic circuit 2d outputs "1" to the main judgment processing unit 2c only when the AND logic circuit 2d receives "1" from the side collision prediction unit 2a and receives "1" from the side collision judgment unit 2b.

The main judgment processing unit 2c transmits a control signal to the side air bag devices 5R and 5L based on the output value "1" received from the AND logic circuit 2d. When a control signal is received from the main judgment processing unit 2c, each of the side air bag devices 5R and 5L is initiated so that the inflator provided therein is driven and the corresponding one of the side air bags 5R and 5L is deployed, thereby protecting the passenger in the vehicle against vehicle side collision.

Figure 4:
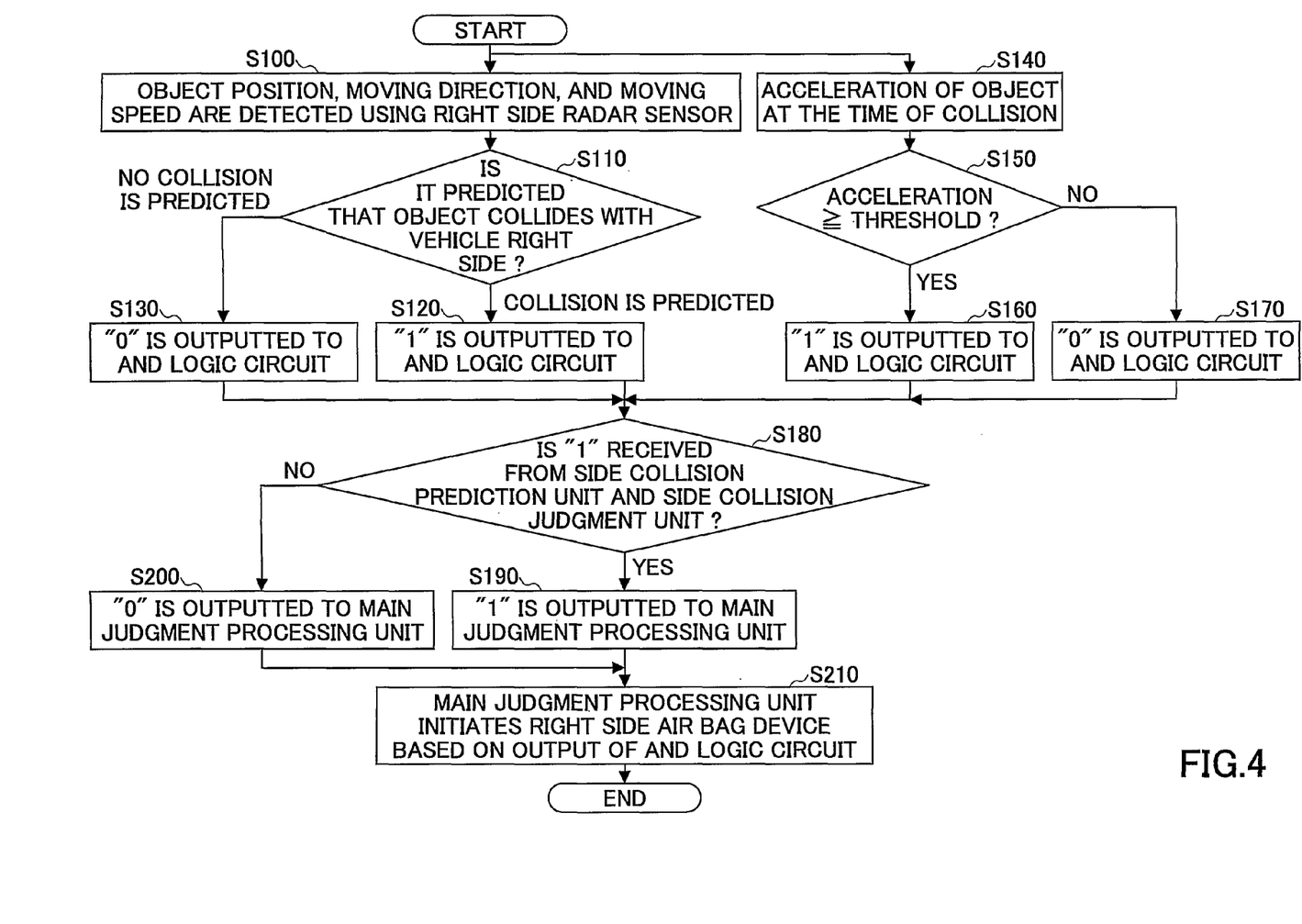
FIG. 4 is a flowchart for explaining a control process performed by the passenger protection device in this embodiment.

Next, a control process performed by the passenger protection device 1 in this embodiment will be explained. FIG. 4 is a flowchart for explaining the control process performed by the passenger protection device 1 in this embodiment.

For the sake of simplicity of description, suppose the case in which a right side object collides with a vehicle right side.

The right side radar sensor 4R detects the relative position of the object, and the relative moving direction and moving speed of the object (S100).

The side collision prediction unit 2a determines whether the object is about to collide with the vehicle right side, based on the relative position of the object, the relative moving direction and the moving speed of the object detected by the right side radar sensor 4R (S110).

The side collision prediction unit 2a outputs "1" to the AND logic circuit 2d, when it predicts that the object is about to collide with the vehicle right side (S120).

On the other hand, the side collision prediction unit 2a outputs "0" to the AND logic circuit 2d, when it predicts that the object is not about to collide with the vehicle right side (S130).

Moreover, the right side collision sensor 3R detects the acceleration of the object to the vehicle right side at the time when the object collides with the vehicle right side (S140).

Based on whether the acceleration detected by the right side collision sensor 3R exceeds the predetermined threshold N1, the side collision judgment unit 2b judges whether the object has collided with the vehicle right side (S150).

The side collision judgment unit 2b outputs "1" to the AND logic circuit 2d, when it is determined that the object has collided with the vehicle right side (S160).

On the other hand, the side collision judgment unit 2b outputs "0" to the AND logic circuit 2d, when it is determined that the object has not collided with the vehicle right side (S170).

The AND logic circuit 2d determines whether "1" is received from the side collision prediction unit 2a and the side collision judgment unit 2b (S180). The AND logic circuit 2d outputs "1" to the main judgment processing unit 2c, when "1" is received from the side collision prediction unit 2a and the side collision judgment unit 2b (S190).

On the other hand, the AND logic circuit 2d outputs "0" to the main judgment processing unit 2c, when "0" is received from the side collision prediction unit 2a or the side collision judgment unit 2b (S200).

The main judgment processing unit 2c transmits a control signal to the right side air bag device 5R based on the output value "1" received from the AND logic circuit 2d. When the control signal is received from the main judgment processing unit 2c, the right side air bag device 5R is initiated, so that the inflator is driven and the right side air bag is deployed (S210).

Although the case in which an object collides with the vehicle right side has been described in the above-mentioned embodiment, a case in which an object collides with the vehicle left side is essentially the same as in the above-mentioned embodiment, and a description thereof will be omitted.

In the passenger protection device 1 of the above-mentioned embodiment, when it is predicted by the side collision prediction unit 2a that an object is about to collide with the vehicle, and it is judged by the side collision judgment unit 2b that the object has collided with the vehicle, the side air bag in either of the side air bag devices 5R and 5L is developed. By this configuration, the judgment on whether the object has collided with the vehicle can be carried out certainly, and the passenger protection unit can be initiated certainly. Therefore, the malfunction of the passenger protection device 1 can be prevented, and the passenger protection unit can be initiated certainly.

Moreover, the collision judgment can be performed with high precision, without changing the predetermined threshold N1 of the side collision judgment unit 2b, and the malfunction of the passenger protection device 1 can be prevented and the passenger protection unit can be initiated certainly.

Next, a modification of the above-mentioned embodiment will be explained.

In the above-mentioned embodiment, the radar sensors 4R and 4L are used in the passenger protection device 1. Alternatively, ultrasonic sensors or imaging sensors may be used instead, and any combination of the radar sensors, the ultrasonic sensors, and the imaging sensors may be used instead.

For example, the ultrasonic sensors are disposed in the left side and the right side of the vehicle, respectively. Each ultrasonic sensor transmits an ultrasonic wave to an object in the circumference of the vehicle, such as another vehicle and an obstacle. And the right side ultrasonic sensor detects the distance between the vehicle and an object on the right side of the vehicle, and the relative moving direction and moving speed of the object to the vehicle, based on the reflected wave from the object. On the other hand, the left side ultrasonic sensor detects the distance between the vehicle and an object on the left side of the vehicle, and the relative moving direction and moving speed of the object to the vehicle, based on the reflected wave from the object.

Moreover, for example, the imaging sensor is provided with a camera which captures an image of a side face of the vehicle, and with an image processing unit which detects the distance between the vehicle and the object, and the relative moving direction and the moving speed of the object to the vehicle, based on the image captured by the camera.

Figure 5:
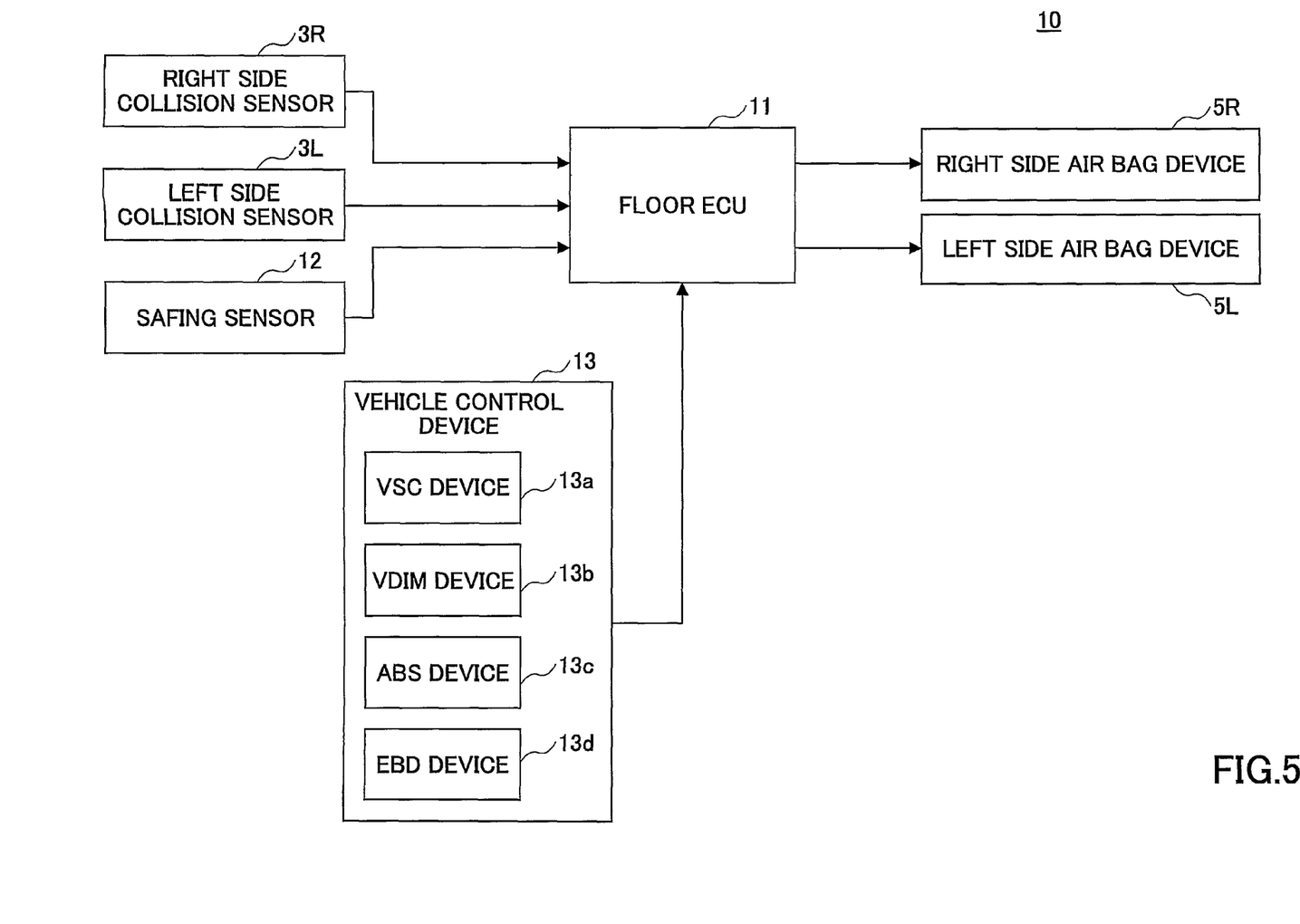
FIG. 5 is a block diagram showing the composition of a passenger protection device in an embodiment of the invention.

Next, a description will be given of another embodiment of the invention. FIG. 5 shows the composition of a passenger protection device in this embodiment.

In FIG. 5, the elements which are the same as corresponding elements in FIG. 1 are designated by the same reference numerals, and a description thereof will be omitted.

In the passenger protection device 10 of FIG. 5, a safing sensor (second impact detection unit) 12 which is disposed at the central part of the vehicle is connected to a floor ECU 11. The safing sensor 12 is, for example, an acceleration sensor which detects the acceleration in the vehicle right/left direction at the time of vehicle side collision. The safing sensor 12 transmits the detected acceleration to the floor the ECU 11.

Moreover, in the passenger protection device 10 of FIG. 5, a vehicle control device 13 which performs a control process to stabilize operation of the vehicle is connected to the floor ECU 11. When the behavior of the vehicle is in an unstable state, the vehicle control device 13 performs a control process to stabilize the behavior of the vehicle. Then, the vehicle control device 13 transmits a control start signal which indicates the start of performance of the control process, to the floor ECU 11. The floor ECU 11 can recognize that the behavior of the vehicle has changed into an unstable state, when the control start signal is received from the vehicle control device 13.

For example, the vehicle control device 13 is constituted so that the vehicle control device 13 includes a VSC (vehicle stability control) device 13a, a VDIM (vehicle dynamic integrated management) device 13b, an ABS (anti-lock braking system) device 13c, and an EBD (electronic brake force distribution, or electronically controlled damping force distribution control) device.

For example, when the front or rear wheel of the vehicle has a skid tendency at the time of rapid turning of the vehicle and the running of the vehicle is in an unstable state, the VSC device 13a automatically controls the engine output and the brake device of each wheel in order to stabilize the running of the vehicle.

At this time, the VSC device 13a transmits a control start signal to the floor ECU 11. The floor ECU 11 recognizes, when the control start signal is received from the VSC device 13a, that the behavior of the vehicle is in an unstable state and the control process to stabilize the behavior of the vehicle is performed.

Figure 6:
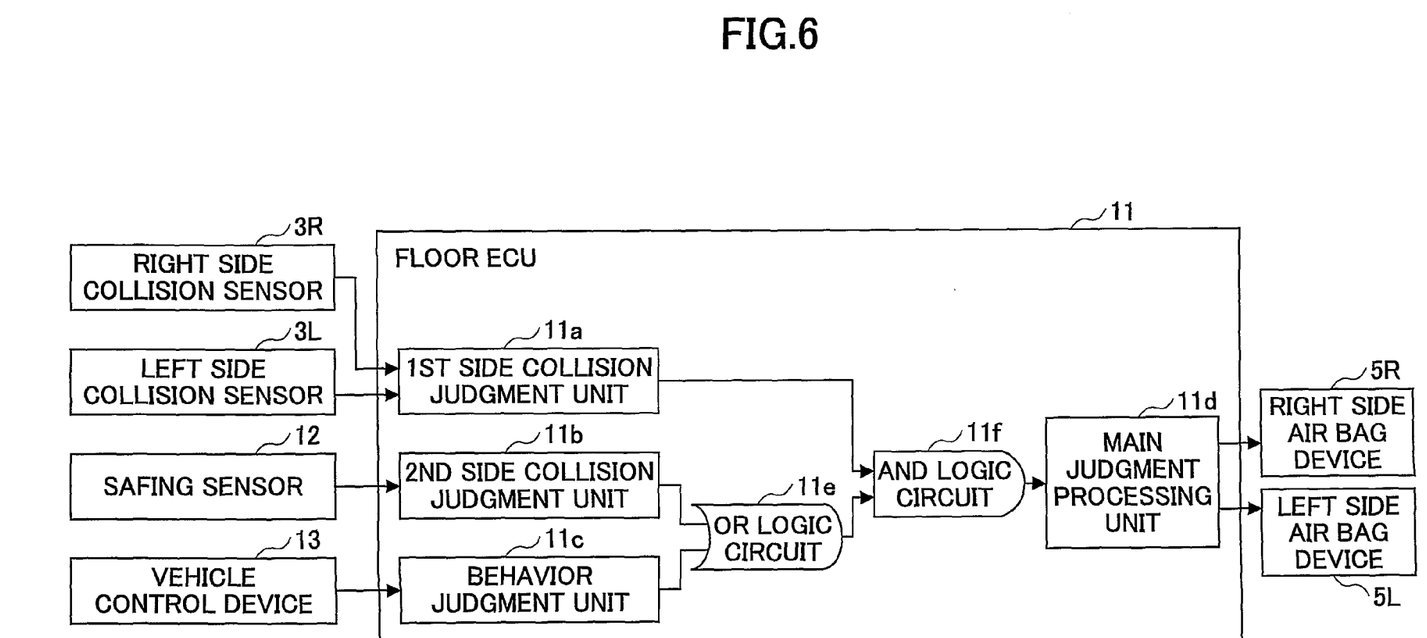
FIG. 6 is a block diagram of the floor ECU of the passenger protection device in this embodiment.

As shown in FIG. 6, the floor ECU 11 is constituted so that the floor ECU 11 includes a first side collision judgment unit 11a which determines whether the object has collided with the vehicle side face, based on the acceleration detected by the right side collision sensor (first impact detection unit) 3R and the left side collision sensor (first impact detection unit) 3L, a second side collision judgment unit 11b which determines whether the object has collided with the vehicle side face, based on the acceleration detected by the safing sensor 12, a behavior judgment unit 11c which determines whether the behavior of the vehicle is in an unstable state, based on the control start signal from the vehicle control device 13, and a main judgment processing unit 11d which transmits a control signal to the side air bag devices 5R and 5L.

The first side collision judgment unit 11a is provided to determine that the object has collided with the vehicle right side, when the acceleration in the vehicle right/left direction detected by the right side collision sensor 3R exceeds a predetermined threshold N2. And the first side collision judgment unit 11a is provided to determine that the object has collided with the vehicle left side, when the acceleration in the vehicle right/left direction detected by the left side collision sensor 3L exceeds the predetermined threshold N2.

The second side collision judgment unit 11b is provided to determine that the object has collided with the vehicle side face, when the acceleration in the vehicle right/left direction detected by the safing sensor 12 exceeds a predetermined threshold N3.

The behavior judgment unit 11c is provided to judge that the object concerned is about to collide with the vehicle side face, based on an unstable behavior of the vehicle. In other words, the behavior judgment unit 11c judges that the collision of the object with the vehicle side face is in an inescapable state, or the object is in a dangerous condition with a high possibility of collision with the vehicle side face.

Specifically, the behavior judgment unit 11c determines that the behavior of the vehicle is in an unstable state, when a control start signal is received from the VSC device 13a.

The main judgment processing unit 11d is provided to transmit a control signal to each of the side air bag devices 5R and 5L when at least one of a judgment of the second side collision judgment unit 11b that the object has collided with the vehicle side face and a judgment of the behavior judgment unit 11c that the behavior of the vehicle is in an unstable state is performed, and a judgment of the first side collision judgment unit 11a that the object has collided with the vehicle side face is performed.

When a control signal is received from the main judgment processing unit 11d, each of the side air bag devices 5R and 5L is initiated so that the inflator provided therein is driven and the corresponding one of the side air bags 5R and 5L is deployed, thereby protecting the passenger in the vehicle against vehicle side collision.

Specifically, in the floor ECU 11 of FIG. 6, the output of the second side collision judgment unit 11b and the output of the behavior judgment unit 11c are connected to the inputs of an OR logic circuit 11e, respectively, and the output of the OR logic circuit 11e and the output of the first side collision judgment unit 11a are connected to the inputs of an AND logic circuit 11f, respectively.

In the embodiment of FIG. 6, the second side collision judgment unit 11b outputs "1" to the OR logic circuit 11e, if it judges that the object has collided with the vehicle side face. And the behavior judgment unit 11c outputs "1" to the OR logic circuit 11e, if it judges that the behavior of the vehicle is in an unstable state.

Moreover, in the embodiment of FIG. 6, the OR logic circuit 11e outputs "1" to the AND logic circuit 11f, if "1" is received from at least one of the second side collision judgment unit 11b and the behavior judgment unit 11c.

In the embodiment of FIG. 6, the first side collision judgment unit 11a outputs "1" to the AND logic circuit 11f, if it judges that the object has collided with the vehicle side face. And the AND logic circuit 11f outputs "1" to the main judgment processing unit 11d, if "1" is received from the OR logic circuit 11e and "1" is received from the first side collision judgment unit 11a. Then the main judgment processing unit 11d transmits a control signal to the side air bag devices 5R and 5L based on the output value "1" received from the AND logic circuit 11f.

Figure 7:
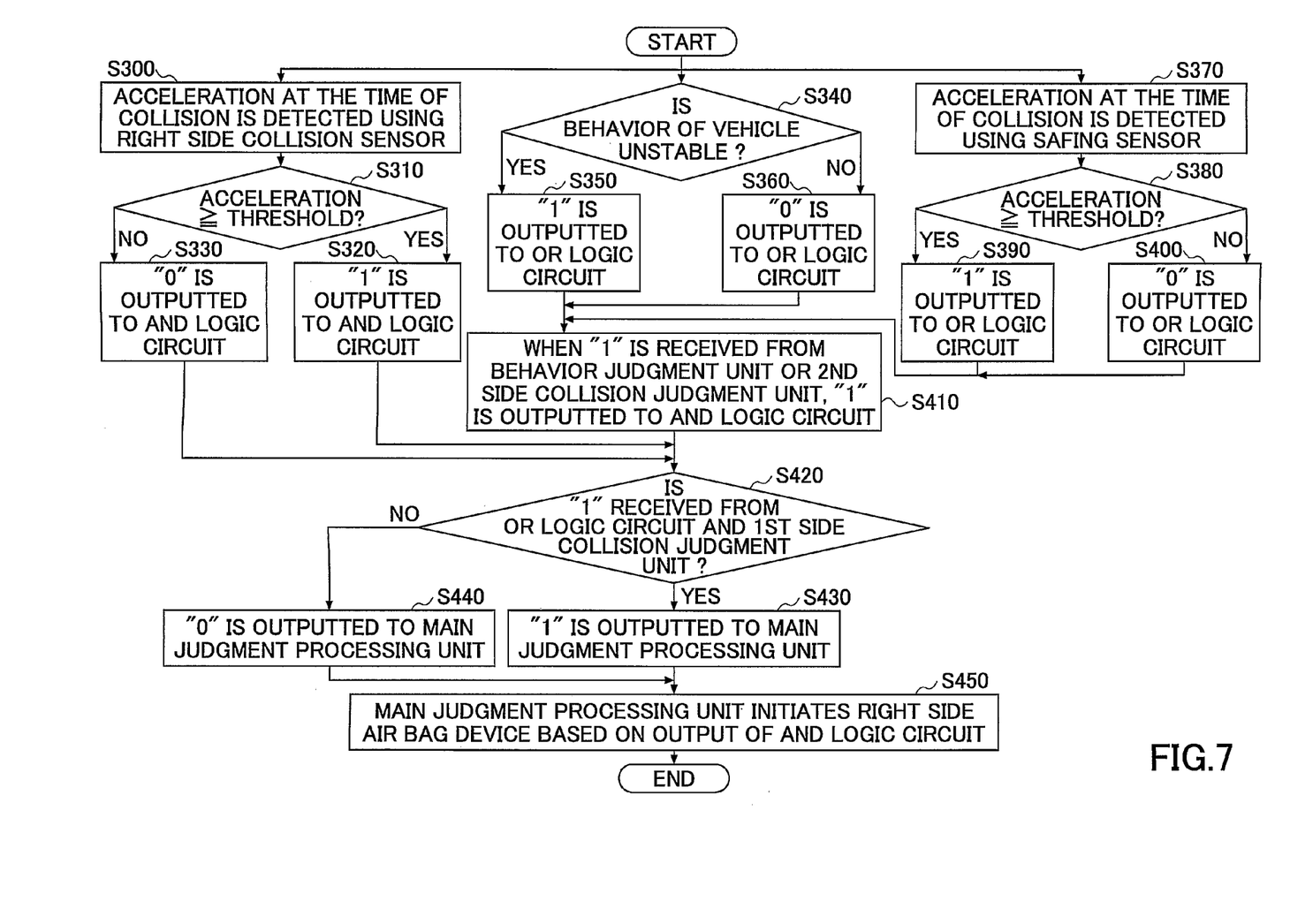
FIG. 7 is a flowchart for explaining a control process performed by the passenger protection device in this embodiment.

Next, a control process performed by the passenger protection device 10 in this embodiment will be explained. FIG. 7 is a flowchart for explaining the control process performed by the passenger protection device 10 in this embodiment.

For the sake of simplicity of description, suppose the case in which a right side object collides with a vehicle right side.

The right side collision sensor 3R detects acceleration at the time the object collides with the vehicle right side (S300).

The first side collision judgment unit 11a determines whether the acceleration detected by the right side collision sensor 3R exceeds the predetermined threshold N2, and the object has collided with the vehicle right side (S310).

The first side collision judgment unit 11a outputs "1" to the AND logic circuit 11f, when it judges that the object has collided with the vehicle right side (S320).

On the other hand, the first side collision judgment unit 11a outputs "0" to the AND logic circuit 11f, when it judges that the object has not collided with the vehicle right side (S330).

Simultaneously, the behavior judgment unit 11c determines whether the behavior of the vehicle is in an unstable state, based on whether a control start signal is received from the vehicle control device 13, such as the VSC device 13a (S340).

When it is determined at the step S340 that the behavior of the vehicle is in an unstable state, the behavior judgment unit 11c outputs "1" to the OR logic circuit 11e (S350).

On the other hand, when it is determined at the step S340 that the behavior of the vehicle is not in an unstable state, the behavior judgment unit 11c outputs "0" to the OR logic circuit 11c (S360).

Simultaneously, the safing sensor 12 detects acceleration at the time the object collides with the vehicle right side (S370).

The second side collision judgment unit 11b determines whether the acceleration detected by the safing sensor 12 exceeds the predetermined threshold N3, and the object has collided with the vehicle right side (S380).

The second side collision judgment unit 11b outputs "1" to the OR logic circuit 11e, when it determines that the object has collided with the vehicle right side (S390).

On the other hand, the second side collision judgment unit 11b outputs "0" to the OR logic circuit 11e, when it determines that the object has not collided with the vehicle right side (S400).

The OR logic circuit 11e outputs "1" to the AND logic circuit 11f, when "1" is received from the behavior judgment unit 11c or the second side collision judgment unit 11b (S410).

The AND logic circuit 11f determines whether "1" is received from the first side collision judgment unit 11a and the OR logic circuit 11e (S420). The AND logic circuit 11f output "1" to the main judgment processing unit 11d, when it determines that "1" is received from the first side collision judgment unit 11a and the OR logic circuit 11e (S430).

On the other hand, the AND logic circuit 11f output "0" to the main judgment processing unit 11d, when "0" is received from the first side collision judgment unit 11a or the OR logic circuit 11e (S440).

The main judgment processing unit 11d transmits a control signal to the right side air bag device 5R based on the output value "1" received from the AND logic circuit 11f. When the control signal is received from the main judgment processing unit 11d, the right side air bag device 5R is initiated, so that the inflator is driven and the right side air bag is deployed (S450).

Although the case in which an object collides with the vehicle right side has been described in the above-mentioned embodiment, a case in which an object collides with the vehicle left side is essentially the same as in the above-mentioned embodiment, and a description thereof will be omitted.

In the passenger protection device 10 of the above-mentioned embodiment, when at least one of a judgment of the second side collision judgment unit 11b that the object has collided with the vehicle side face and a judgment of the behavior judgment unit 11c that the behavior of the vehicle is in an unstable state is performed, and a judgment of the first side collision judgment unit 11a that the object has collided with the vehicle side face is performed, the side air bag of the corresponding one of the side air bag devices 5R and 5L is deployed in order to protect the passenger in the vehicle against the vehicle side collision. Accordingly, the judgment that the object has collided with the vehicle can be performed accurately, and the passenger protection unit can be initiated certainly. Therefore, the malfunction of the passenger protection device 10 can be prevented and the passenger protection unit can be initiated certainly.

In addition, in the passenger protection device 10 of the above-mentioned embodiment, the behavior judgment unit 11c determines whether the behavior of the vehicle is changed into an unstable state, such as a skid or a spin of the vehicle, and when vehicle side collision occurs, the side air bag devices 5R and 5L can be initiated certainly.

Next, a modification of the passenger protection device 10 in the above-mentioned embodiment will be explained.

In the above-mentioned embodiment, the behavior judgment unit 11c of the floor ECU 11 determines whether the behavior of the vehicle is in an unstable state, based on whether a control start signal is received from the vehicle control device 13. Alternatively, the behavior judgment unit 11c may be configured so that it determines whether the behavior of the vehicle is in an unstable state, based on a yaw rate of the vehicle detected by a yaw rate sensor. For example, the behavior judgment unit 11c may be configured so that it determines that the behavior of the vehicle is in an unstable state, when the yaw rate of the vehicle detected by the yaw rate sensor exceeds a predetermined value.

In this case, a yaw rate sensor which is disposed at the central part of the vehicle is connected to the floor ECU 11. The yaw rate sensor transmits the detected yaw rate of the vehicle to the floor ECU 11.

The above-mentioned embodiment of FIG. 5 may be configured so that, when the behavior judgment unit 11c judges that the behavior of the vehicle is in an unstable state, based on the control start signal from the vehicle control devices 13, such as the VSC device 13a, the predetermined threshold N3 of the second side collision judgment unit 11b is changed to a smaller value.

The safing sensor 12 is disposed at the central part of the vehicle which is distant from the vehicle side face which an object collides with. For this reason, the acceleration detected by the safing sensor 12 may have the amount of attenuation which is larger than that of the acceleration detected by the side collision sensors 3R and 3L disposed in the vehicle side faces. Therefore, the second side collision judgment unit 11b can judge the collision of an object with the vehicle side face more certainly by reducing the predetermined threshold N3.

In addition, after checking that the behavior judgment unit 11c determines that the behavior of the vehicle is in an unstable state and there is a high possibility of collision of an object with the vehicle side face, the predetermined threshold N3 is reduced. Thus, erroneous detection of vehicle side collision can be prevented certainly and the malfunction of the passenger protection device 10 can be prevented.

The present invention is not limited to the above-described embodiments, and variations and modifications may be made without departing from the scope of the present invention.

For example, in the above-described embodiments, the acceleration sensors are used as the right side collision sensor 3R and the left side collision sensor 3L. Alternatively, pressure sensors or the pressure sensors and the acceleration sensors in combination may be used instead. The pressure sensors in such alternative embodiment are provided to detect a pressure of the object acting on the vehicle side face at the time of vehicle side collision.

In the above-mentioned embodiments, the side air bag devices 5R and 5L are used. Alternatively, curtain shield air bag devices 7R and 7L or the curtain shield air bag devices 7R and 7L and the side air bag devices 5R and 5L in combination may be used instead as shown in FIG. 2. The curtain shield air bag devices 7R and 7L in such alternative embodiment are air bags which are disposed extending from the front pillar to the C pillar of the backseat in the vehicle, and provided to protect the side of a passenger's head at the time of vehicle side collision.

In addition, in the composition where the curtain shield air bag devices 7R and 7L are disposed, a pair of right and left acceleration sensors (satellite sensors) 8R and 8L for these air bags as shown in FIG. 2 may be disposed in the rear side parts of the vehicle for performing the side collision detection.

Further, the present application is based upon and claims the benefit of priority of Japanese patent application No. 2006-079114, filed on Mar. 22, 2006, the entire contents of which are incorporated herein by reference.

The invention claimed is:

1. A passenger protection device comprising:
a first impact detection unit disposed in each of a right vehicle side face and a left vehicle side face of a vehicle to detect an impact of an object on at least one of the right vehicle side face and the left vehicle side face;
a unitary first side collision judgment unit that receives information from both of the first impact detection units and determines whether the object has collided with the right vehicle side face and determines whether the object has collided with the left vehicle side face, based on the impact detected by the first impact detection units;
a second impact detection unit disposed in a position different from a position of the first impact detection units to detect an impact of the object on at least one of the right vehicle side face and the left vehicle side face;
a second side collision judgment unit that determines whether the object has collided with one of the right vehicle side face and the left vehicle side face, based on the impact detected by the second impact detection unit;
a behavior judgment unit that determines whether a behavior of the vehicle is in an unstable state, based on a control start signal received from a vehicle control device when the vehicle control device starts performing a vehicle stability control process to stabilize an operation of the vehicle; and
a passenger protection unit that protects a passenger in the vehicle,
wherein the passenger protection unit is initiated in the following cases:
a first case in which the first side collision judgment unit determines that the object has collided with the right vehicle side face or determines that the object has collided with the left vehicle side face and the second side collision judgment unit determines that the object has collided with one of the right vehicle side face and the left vehicle side face, and
a second case in which the first side collision judgment unit determines that the object has collided with the right vehicle side face or determines that the object has collided with the left vehicle side face and the behavior judgment unit determines that the behavior of the vehicle is in an unstable state.

2. The passenger protection device of claim 1, wherein the second side collision judgment unit determines that the object has collided with at least one of the right vehicle side face and the left vehicle side face, when a value of the impact detected by the second impact detection unit exceeds a predetermined threshold, and
wherein the second side collision judgment unit reduces the predetermined threshold when the behavior judgment unit determines that the behavior of the vehicle is in an unstable state.

3. The passenger protection device of claim 1, wherein each of the first impact detection units and the second impact detection unit includes at least one of a pressure sensor and an acceleration sensor which detect an impact of the object on at least one of the right vehicle side face and the left vehicle side face.

4. The passenger protection device of claim 1, wherein the first impact detection units are disposed in a vicinity of a center pillar of a right side wall and in a vicinity of a center pillar of a left side wall of the vehicle, respectively.

5. The passenger protection device of claim 4, wherein the second impact detection unit is disposed at a central part of the vehicle.

6. The passenger protection device of claim 4, wherein the output signal is an output start signal, which indicates a start of performance of the control process.

7. The passenger protection device of claim 1, wherein the passenger protection unit is an air bag device disposed in each of the right vehicle side face and the left vehicle side face of the vehicle.

8. The passenger protection device of claim 1, wherein the first impact detection units include a vehicle right side acceleration sensor in the right vehicle side face and a vehicle left side acceleration sensor in the left vehicle side face.

9. The passenger protection device of claim 1, wherein the second impact detection unit includes a safing sensor that detects an acceleration in a vehicle right/left direction at a time of vehicle side collision.

10. The passenger protection device of claim 1, wherein the vehicle control device includes at least one of a vehicle stability control device, a vehicle dynamic integrated management device, an anti-lock braking device, and an electronic brake force distribution device.

11. The passenger protection device of claim 1, wherein the vehicle control device includes
 a vehicle stability control device,
 a vehicle dynamic integrated management device,
 an anti-lock braking device, and
 an electronic brake force distribution device.

* * * * *